(12) United States Patent
Radovanovic et al.

(10) Patent No.: US 8,756,172 B1
(45) Date of Patent: Jun. 17, 2014

(54) DEFINING A SEGMENT BASED ON INTERACTION PRONENESS

(75) Inventors: Ana Radovanovic, New York, NY (US);
Corinna Cortes, New York, NY (US);
David Tussey, New York, NY (US);
Jocelyn Miller, Hoboken, NJ (US)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 13/209,558

(22) Filed: Aug. 15, 2011

(51) Int. Cl.
*G06N 99/00* (2010.01)
*G06Q 30/02* (2012.01)

(52) U.S. Cl.
CPC .......... *G06N 99/005* (2013.01); *G06Q 30/0241* (2013.01); *G06Q 30/0202* (2013.01)
USPC ............................................. 706/12; 706/45

(58) Field of Classification Search
CPC ............ G06N 99/005; G06Q 30/0241; G06Q 30/0202
USPC ..................................................... 706/12, 45
See application file for complete search history.

(56) References Cited

U.S. PATENT DOCUMENTS

2010/0138553 A1    6/2010  Yuan et al.

OTHER PUBLICATIONS

Chatterjee, et al., Modeling the Clickstream: Implications for Web-Based Advertising Efforts, Marketing Science, vol. 22, No. 4, Fall 2003, pp. 520-541.*

'DoubleClick Blog' [online] Google Inc., Dec. 2009 [retrieved on Aug. 4, 2011]. Retrieved from the internet: <URL: http://www.doubleclick.com/insight/blog/archives/dart-adapt/>.
'Allrecipes Redefines Its Sales Approach with DART Adapt' [online]. Google Inc., 2008 [retrieved on Aug. 4, 2011]. Retrieved from the internet: <URL: http://static.googleusercontent.com/external_content/untrusted_dlcp/www.google.com/en/us/doubleclick/pdfs/cs_allrecipes_081027.pdf>.
'DART Adapt: DoubleClick's Advanced Optimization Solution' [online]. Google Inc., 2007 [retrieved on Aug. 4, 2011]. Retrieved from the internet: <URL: http://www.doubleclick.com/insight/pdfs/dc_dartadaptopt_0704.pdf>.
'DART for Publishers' [online]. Google Inc., 2007 [retrieved on Aug. 4, 2011]. Retrieved from the internet: <URL: http://www.doubleclick.com/insight/pdfs/dc_dfpoverview_0704.pdf>.
'DART® for Publishers Key-Value Targeting Increases Relevance for Autobytel' [online] Google Inc., 2007 [retrieved on Aug. 4, 2011]. Retrieved from the internet: <URL: http://www.doubleclick.com/insight/pdfs/cs_autobytel_0307.pdf>.
'DART Sales Manager' [online]. Google Inc., 2007 [retrieved on Aug. 4, 2011]. Retrieved from the internet: <URL: http://www.doubleclick.com/insight/pdfs/dc_dsmoverview_0704.pdf>.

* cited by examiner

*Primary Examiner* — Wilbert L Starks
(74) *Attorney, Agent, or Firm* — Fish & Richardson P.C.

(57) ABSTRACT

A computer-implemented method for defining a segment based on interaction proneness includes receiving online activity data that specifies instances of presentation for one or more content items, and instances of user interaction detected for any of the content items. The method includes training at least one predictive model on the online activity data, the predictive model trained to predict interaction proneness based on one or more characteristics associated with the instances of user interaction. The method includes identifying, using the predictive model, at least one of the characteristics as being associated with the interaction proneness. The method includes generating at least one segment definition that takes into account the identified characteristic.

17 Claims, 11 Drawing Sheets

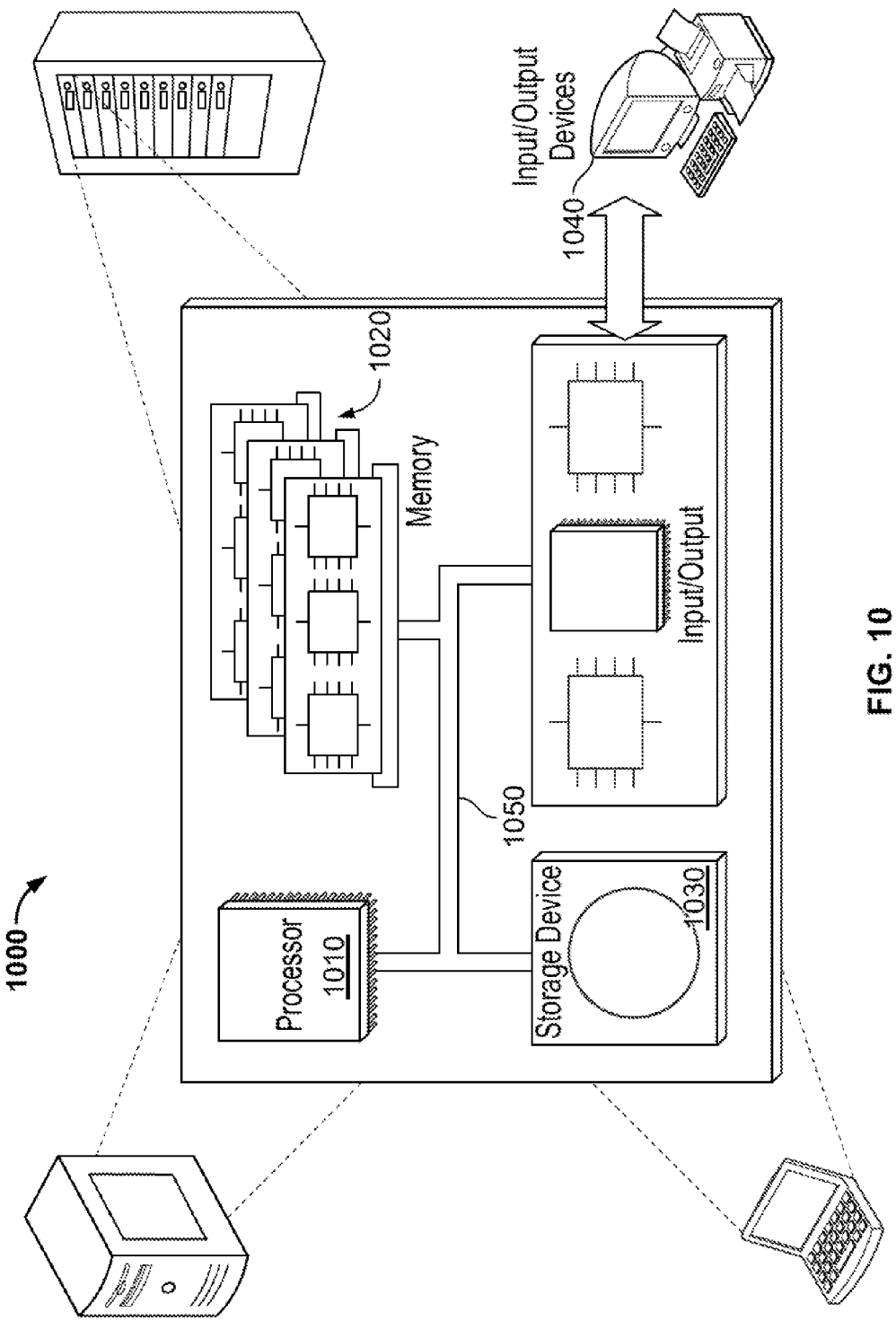

DEFINING A SEGMENT BASED ON INTERACTION PRONENESS

TECHNICAL FIELD

This disclosure relates to content distribution.

BACKGROUND

Advertising is presented in one or more of a variety of communication media, such as online, in periodicals, on billboards, or by radio or TV broadcast, to name just a few of many examples. With the rise of the Internet, online mediums are increasingly being used for distributing ads or other content in novel ways. Advertisers can create an advertising campaign that seeks to target ads to a particular demographic. For example, a website devoted to a particular trade or hobby is a popular location for businesses specializing in that trade or hobby to advertise to potential customers in an effort to increase their sales. The increase in advertising has created an incentive for targeting advertisements to consumers.

Success in distribution of content (e.g., ads) can be defined in terms of one or more measureable entities or variables. In online advertising, ad performance is sometimes quantified in terms of a number of distinct conversions of the ad, wherein a conversion is defined as the occurrence of at least one specific interaction. For example, a conversion criterion can require a user click (or other selection) of a displayed ad; or the user click plus some modicum of user activity on the advertiser's landing page; or the user click plus a completed transaction on the landing page.

SUMMARY

A computer-implemented method for defining a segment based on interaction proneness includes receiving online activity data that specifies instances of presentation for one or more content items, and instances of user interaction detected for any of the content items. The method includes training at least one predictive model on the online activity data, the predictive model trained to predict interaction proneness based on one or more characteristics associated with the instances of user interaction. The method includes identifying, using the predictive model, at least one of the characteristics as being associated with the interaction proneness. The method includes generating at least one segment definition that takes into account the identified characteristic.

The method can be implemented in any of multiple ways. For example, a computer program product tangibly embodied in a computer-readable storage medium can include instructions that when executed by one or more processors perform the method. As another example, a computer system can include one or more processors and a computer-readable storage medium having stored therein instructions that when executed by the one or more processors perform the method.

Implementations can include any or all of the following features. The identification involves determining a coefficient for the predictive model that reflects whether and how the instances of user interaction vary with the instances of presentation. At least one of the content items is a displayed advertisement, the instances of user interaction include at least one click on the displayed advertisement, and the interaction proneness reflect a user tendency to click on the displayed advertisement. The characteristics are selected among signals comprising: user location; user device information; publisher; local query time; local time of page request; page identity; content item properties; keyword in page request; keyvalue; page visiting history; content item interaction history; and combinations thereof. At least one of the characteristics includes a cross product of at least two of the signals. Training the predictive model includes dividing the online activity data into first and second portions and using the first portion to train the predictive model, and identifying the characteristic involves applying the trained model to the second portion. The method further includes ranking at least some of the characteristics with regard to the interaction proneness, the ranking being taken into account in distributing the content item.

Implementations can provide any or all of the following advantages. A more flexible marketing model for content distribution can be provided. Content distribution can be targeted more effectively.

The details of one or more embodiments are set forth in the accompanying drawings and the description below. Other features and advantages will be apparent from the description and drawings, and from the claims.

DESCRIPTION OF DRAWINGS

FIG. 10 is a block diagram of a computing system that can be used in connection with computer-implemented methods described in this document.

Like reference symbols in the various drawings indicate like elements.

DETAILED DESCRIPTION

This document describes systems and techniques for determining and using interaction proneness in content distribution. For example, the interaction proneness can indicate which users are more likely to click on (or in any other way select) displayed advertisements. The interaction proneness can be determined by training one or more prediction models on collected data.

Figure 1:
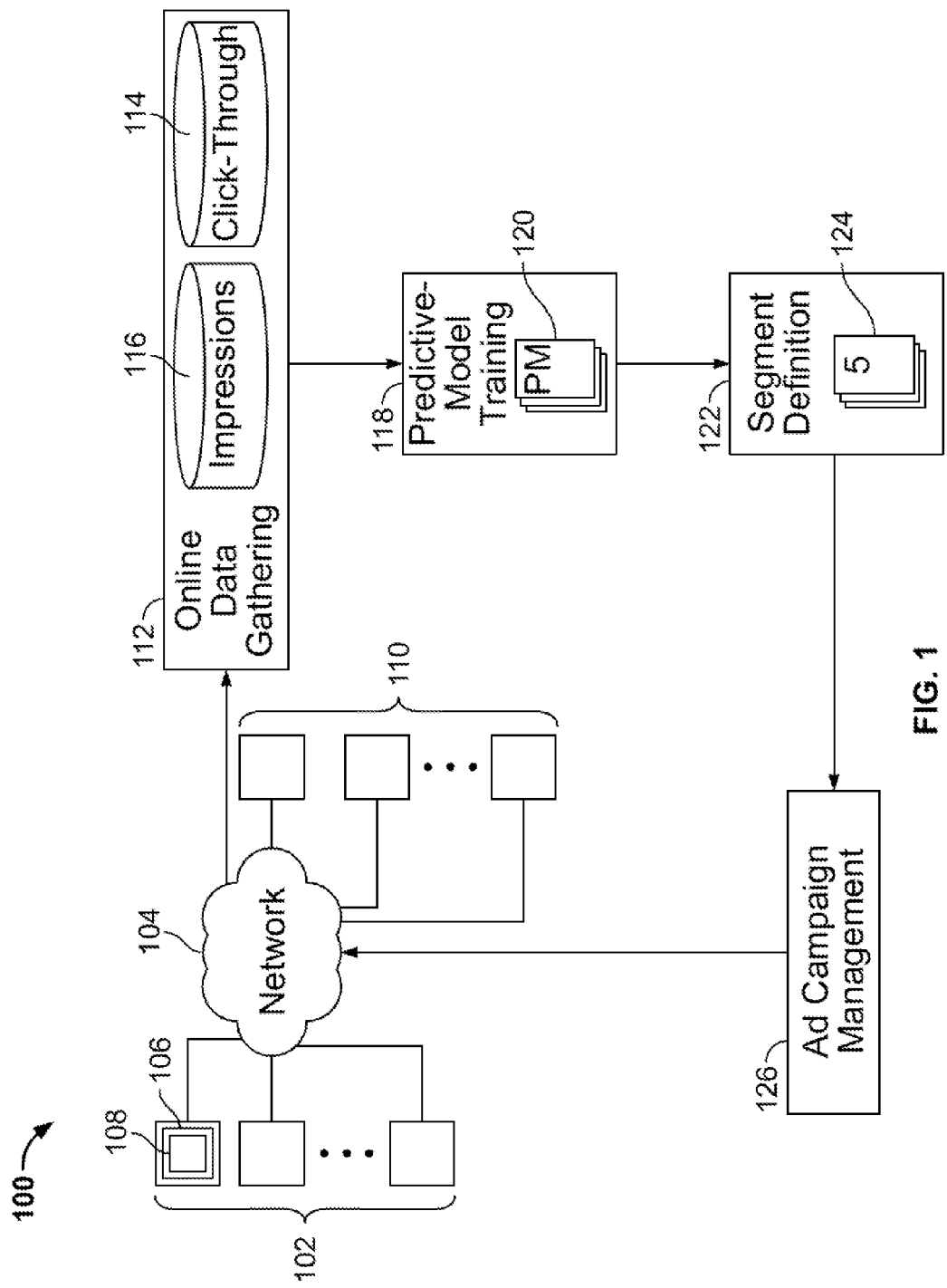
FIG. 1 schematically shows an example of a system for determining and using interaction proneness.

FIG. 1 schematically shows an example of a system 100 for determining and using interaction proneness. In the system 100, one or more user devices 102 are configured for communication with each other and/or others using any kind of network 104, including, but not limited to, the internet, a mobile device network, or a local area network. The user devices 102 can include personal computers, laptops, mobile devices, and/or cell phones, to name just a few examples. Each of the user devices 102 can download or otherwise access one or more pages 106 or other form of content (e.g., audio or video) via the network 104. In some implementations, the page 106 is generated by a browser on the user device 102 that executes code according to one or more markup languages (e.g., hypertext markup language (HTML), extensible markup language (XML), or versions thereof).

For example, the user device 102 requests the page 106 from one of multiple publisher systems 110, and the page 106 includes a script (or any other form of executable code) that provides for an advertisement ("ad") 108 to be sent to the user device and inserted at a particular place in the page 106. The page 106 can be any type of online page including, but not limited to, a web page or other internet page.

The content accessed using the user device 102 (e.g., the page 106) includes one or more particular content items, in this example an ad 108. The ad 108 can be displayed using any suitable graphics technique, such as in form of an image file that when executed by the user device 102 generates one or more images on the screen of the user device. In implementations where the user device 102 also or instead accesses content other than in page form (e.g., audio or video), the content item can instead have another format, e.g., an audio or video clip.

The ad 108 is configured for one or more types of user interaction. In some implementations, a displayed graphic is configured so that the user can take one or more actions with regard to the ad. For example, the user can click on the ad using any suitable kind of pointing device, keypad or touch-sensitive surface. The corresponding input received by the user device can trigger one or more responses. For example, user navigation can be initiated to present or otherwise play a message from the advertiser (e.g., the browser is redirected to an advertiser's page that is associated with the ad). The ad 108 (or other content) can be provided for insertion in the page 106 by the publisher system 110 or by a separate advertisement distributor or other third party.

Online activities can be tracked, for example as a basis to compensate publishers for publishing the ad(s) and/or to aid advertisers in creating advertisement campaigns. In this example, the system 100 includes an online data gathering component 112 that registers some or all of the interactions that occur with the ad 108. The component 112 can receive its information from one or more sources. For example: when the user clicks on the ad 108, this can prompt the user device 102 to notify the component 112 directly, or via the publisher system 110, that the ad has been clicked. As another example, the advertiser whose ad is clicked can automatically notify the component 112.

When user information is transmitted, stored or processed, privacy rights of users are respected. For example, privacy policies regarding how information is collected and/or used can be created and enforced. An implementation can be designed as an "opt-in only" regime, such that the implementation will only be used for persons who have explicitly agreed to participate. As another example, an "opt-out" regime gives users the right and ability to decline participation.

In some implementations, the identities of users are protected by use of one or more anonymization processes. In some implementations, certain information associated with users is anonymized or partially redacted. For example, user history and login association, or device history and address association, can be anonymized by use of collision-resistant hashes that hash the identification data. For example, user identities (such as user names or user electronic mail addresses) can be replaced in whole or in part with a numerical string; user Internet Protocol addresses can be processed to eliminate some information such as, for example, the class C and class D subdomain information; user browsing history can be disassociated with a particular user identity and replaced with a user interest category; and user interest categories can be generalized to minimize association with specific user identities or user browsing histories, and the like. Additional privacy protection techniques can also be used, such as the use of one or more encryption processes.

The online data gathering component 112 stores information about the user interactions that take place with respect to presented ads (or other content). In this implementation, the component 112 stores information in a click-through repository 114, such as one or more characteristics regarding each individual click action. Such gathered information is sometimes referred to as a signal that relates to the click. Examples of signals that can be used include, but are not limited to: user location (e.g., by country, city or other category); user device information (e.g., browser type, operating system type, cookie identifier); publisher (e.g., on whose page the ad appears); local query time (e.g., when the user submits a search engine query that triggers content distribution); local time of page request (e.g., when the user accesses a page that triggers content distribution); page identity (e.g., a URL or other identifier for the page); content item properties (e.g., ad identifier, ad size, advertiser name); keyword in page request (e.g., information about another page from which the user navigates to the page having the ad); keyvalue (e.g., information about the tile, section, channel, or content group associated with the content presentation); page visiting history (e.g., how many times the user has visited the same page in the past); content item interaction history (e.g., how many times the user has clicked on this ad, or on any ad, in the past); and combinations thereof. Any suitable type of data storage can be used for the click-through repository 114.

The online data gathering component 112 also has access to information about the content that has been presented (e.g., displayed ads), regardless of whether the content triggered any user interaction. In some implementations, an impressions repository 116 is provided that catalogs all instances where the ad 108 (or any other ads) has appeared on a page, including, but not limited to, the page 106. In some implementations impression data is provided by one or more ad serving organizations who act on advertisers' behalf in providing ads for publication.

Some or all of the gathered online data is analyzed. Particularly, a predictive-model training environment 118 can be provided. In some implementations, the predictive-model training environment 118 includes suitable tools for fitting one or more predictive models 120 to the data. Training of different predictive models within the predictive-model training environment 118 can be done using statistical software packages. For example, and without limitation, the statistical computing software package known as R (created by "The R Project for Statistical Computing"), or a statistical package in MATLAB from The MathWorks, Inc., can be used. As another example, models can be trained on very large data sets (e.g., on the order of tens of billions of instances or more). The prediction(s) can include any suitable type of estimation or appreciation regarding users' proneness to interact with presented content. In some implementations, one or more coefficients of the predictive model 120 can be set, adjusted, or readjusted so that the predictive model makes the best possible prediction based on the available data. For example, the predictive model may include a coefficient that reflects whether and how the number of user interactions varies with variations in the number of impressions.

At a high level, the prediction model 120 can be considered an operator or other function P that maps from the domain of impressions to one or more other domains. For example, if M number of content impressions occurs, then the predictive model 120 predicts that N number of users will interact with (e.g., click on) the content:

$$N=P(M)$$

Depending on the predictive model 120, one or more other parameters can be taken into account in addition to the number of impressions. The predictive model can depend on which content is being presented; where the content is being presented; who the likely recipients of the content are; and/or the timing of the content presentation, to name just a few examples.

The training of the predictive model 120 can make use of one or more statistical approaches. In some implementations, the gathered online activity data is divided in two portions, where one portion is used to train the predictive model, and the other portion is used as input to test the model and/or to obtain predictive results. For example, some or all of the data in the click-through repository 114 can be divided (in any arbitrary way) into a 90% portion and a 10% portion, meaning that 9/10 of all detected clicks are in the 90% portion and the remaining 1/10 of the clicks are in the 10% portion. The predictive model can then be trained on the 90% portion, for example by setting model coefficients according to the data. The trained model can then be applied to the 10% portion, and one or more results can be evaluated.

The online activity data can be processed multiple times. In some implementations, the 90/10 partitioning mentioned above can be performed differently on the same data, meaning that the respective 90% and 10% portions now include at least partly different sets of click records. Because the 90% portion is not exactly the same as it was before, the training may result in somewhat different coefficients for the predictive model. For example, ten different 90/10 partitions can be done and processed substantially as described above, and the obtained sets of model coefficients can be aggregated (e.g., averaged) to obtain a final version of the coefficients.

Once the training has been performed on at least one of the predictive models 120, it can be used in analyzing how the occurrence of user interaction is influenced by one or more characteristics. Particularly, one or more characteristics can be identified using the predictive model as being associated with interaction proneness. Such knowledge about interaction proneness (e.g., user tendency to click) can be used in a segment definition module 122 in some implementations. Using the segment definition module 122, one or more segments 124 can be defined to take into account the characteristic(s) identified as influencing interaction proneness. For example, when it is determined that those of the user devices 102 that frequently access the page 106 have cookie identifiers that are associated with relatively high degrees of interaction proneness, then the segment 124 can be defined to include the URL or other identifier for the page 106. That is, the advertiser may enter into an ad distribution agreement that the ad(s) should be eligible for publication in one or more contexts defined by the segment 124 (e.g., for display on a particular page).

In some implementations, the segment 124 can be defined as a subset of another, already existing, segment. For example, assume that a particular ad is currently associated with a segment definition that lists fifty publications (e.g., web pages). A more restrictive segment definition can then be generated that includes only some (e.g., thirty) of the current publications. This can be done by analyzing the interaction proneness for each of the publications, and then defining the subset of publications based on the pages whose rates of interaction proneness meet at least a particular threshold (e.g., the rate is among the top 50% of analyzed rates, or the rate value exceeds a threshold).

Figure 2A:
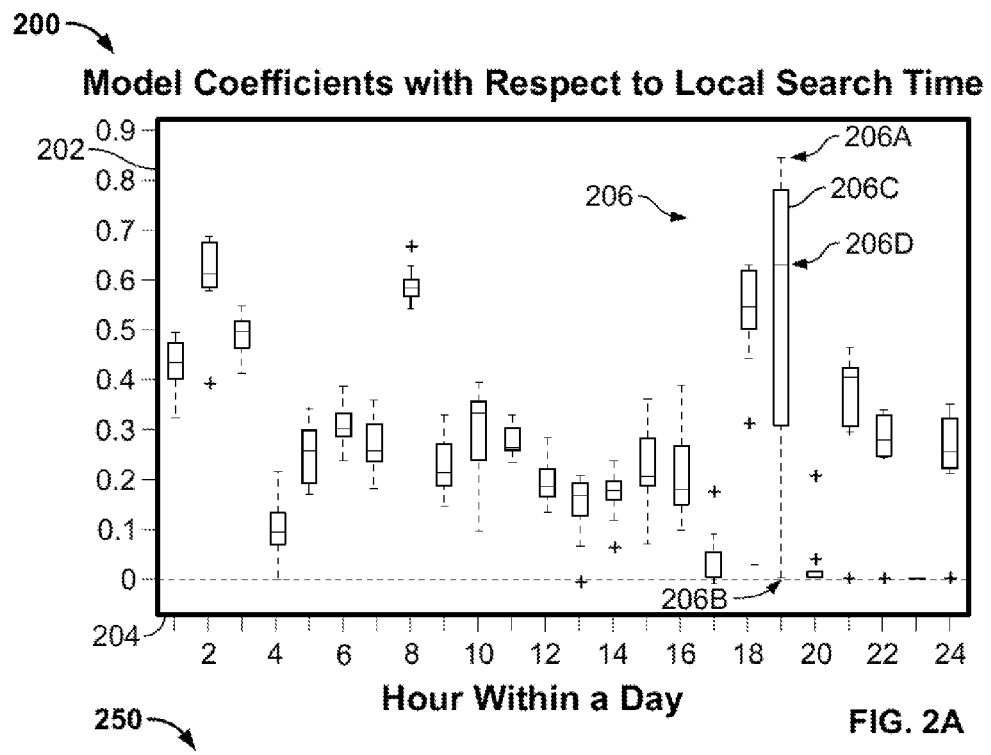
FIGS. 2A-B show example graphs of model coefficients that take time into account.
Figure 2B:
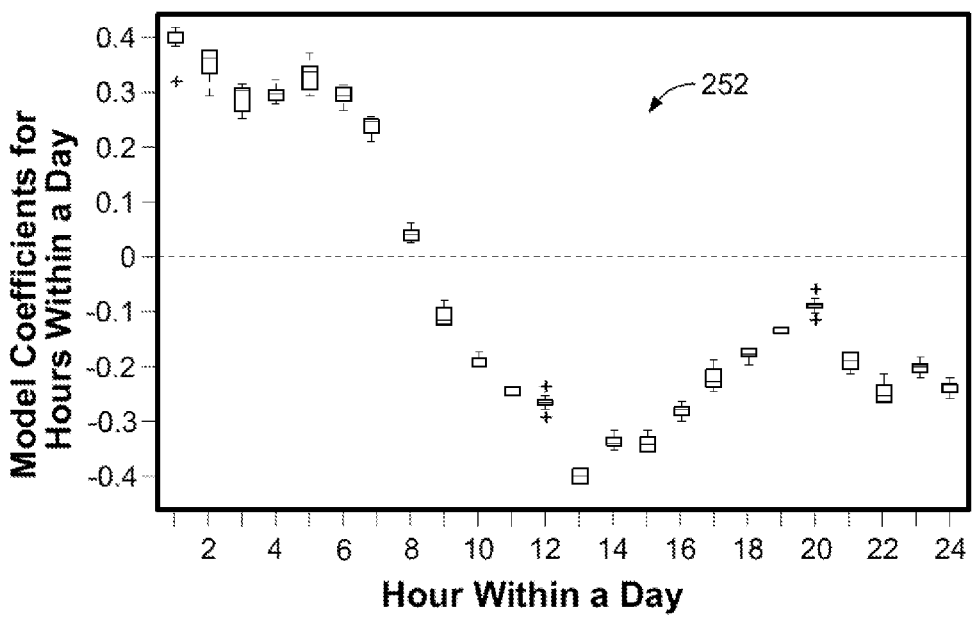

As noted earlier, the identification of one or more characteristics as being associated with interaction proneness can be done by analyzing one or more collections of gathered online activity data. In some implementations, such analysis seeks to isolate each signal to evaluate its relationship, if any, with interaction proneness. For example FIGS. 2A-B show example graphs 200 and 250 of model coefficients that take time into account. In graph 200, a model coefficient is measured against a vertical axis 202 as a function of hour values along a horizontal axis 204.

In this example, the model coefficient is a sensitivity coefficient for the predictive model. That is, the sensitivity coefficient indicates how one variable (e.g., the click-through rate) varies depending on another variable (e.g., the time of day). Generally, a positive sensitivity coefficient indicates that the click-through rate increases with an increasing number of impressions. In contrast, a negative sensitivity coefficient indicates that increasing the number of impressions tends to lower the click-through rate.

The graph 200 includes a coefficient set 206 for each of the twenty-four hours in the day on which the corresponding online activity data was collected. That is, the coefficient set 206 includes a number of sensitivity coefficients calculated for the same online activity data. In some implementations, each of the coefficients in the set 206 corresponds to a particular instance of training the prediction model. For example, the online activity data is portioned in different ways and the model is trained based on one portion at a time, while registering the coefficient(s) resulting from the training. Here, the coefficient set 206 includes a max value 206A and a min value 206B indicating the respective extreme values of the sensitivity coefficients for the corresponding hour.

A box 206C indicates the variability, or spread, in the set of coefficients. For example, the upper and lower edges of the box 206C may indicate a certain number of standard deviations (e.g., one standard deviation) from the average of the coefficients. The coefficient set 206 here also includes a median 206D of the coefficients.

The graph 200 indicates that relatively high coefficients are found in the evening and night hours (e.g., from 6 pm until about 3 am). That is, this approximate time interval is characterized in that an increase in the number of impressions has a relatively strong positive impact on the click-through rate. It can therefore be said that for the particular online activity data that underlies the graph 200, the evening and night users show a relatively high degree of interaction proneness. Stated another way, time of day may be a useful signal for interaction proneness during the evening and night hours.

The graph 250, in contrast, is based on a different collection of online data. In the graph 250, coefficient sets 252 have negative values from about 9 am to midnight, indicating that more impressions during those hours will decrease, not increase, the click-through rate. In the early morning, however (until about 8 am), the coefficient sets 252 have positive values. In other words, more impressions in this time period are likely to generate a higher click-through rate. The time-of-day signal may therefore be useful during those hours.

Figure 3A:
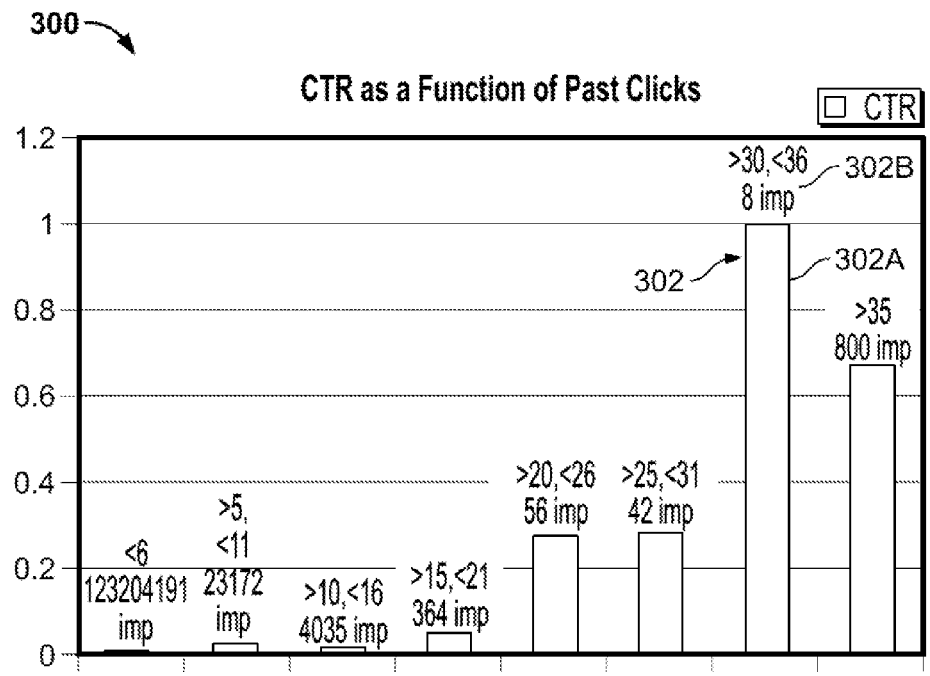
FIG. 3A shows an example bar chart of click-through rate as a function of the number of past clicks.

FIG. 3A shows an example bar chart 300 of click-through rate as a function of the number of past clicks. That is, the online activity data on which the bar chart 300 is based indicates, for each cookie identifier associated with a click, how many times the same cookie identifier has been associated with other clicks (i.e., past clicks) on the same page in a particular time interval (e.g., the past seven days). Each staple 302 includes a bar 302A with a height that indicates the corresponding click-through rate. The staple 302 also includes data 302B, such as the range of the number of past clicks (e.g., more than 30, but less than 36, past clicks), and the number of impressions (e.g., eight). The graph 300 shows that the more times a user clicked on a page in the past, the more likely it is that the user will click on the page again. Whether past clicks is a useful signal may depend also on other factors, such as the relation between the number of users revisiting the page and the total number of visitors.

Figure 3B:
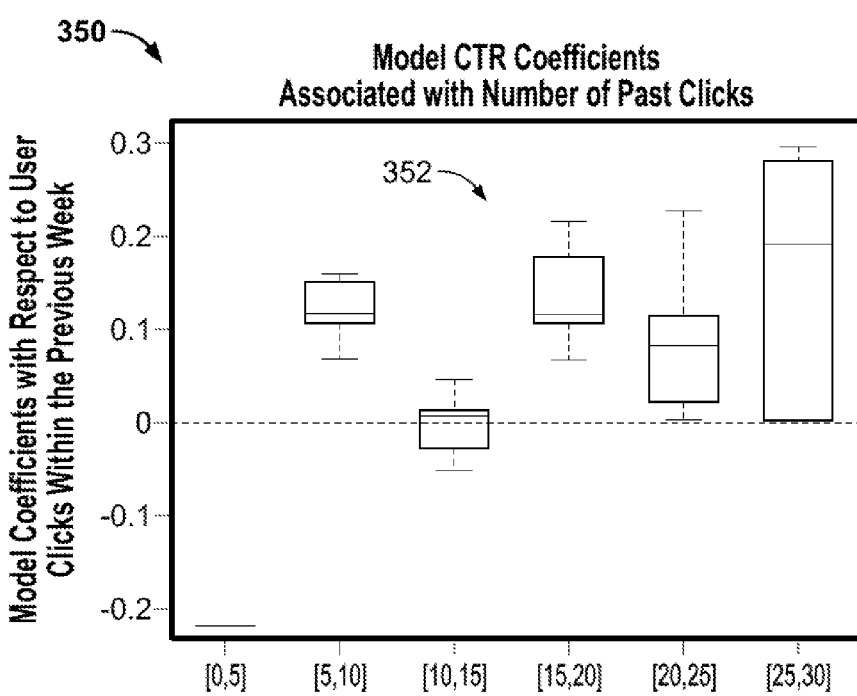
FIG. 3B shows an example graph of model coefficients that take number of past clicks into account.

FIG. 3B shows an example graph 350 of model coefficients that take number of past clicks into account. The graph 350 includes coefficient sets 352 that are analogous to the coefficient sets described above.

Figure 4A:
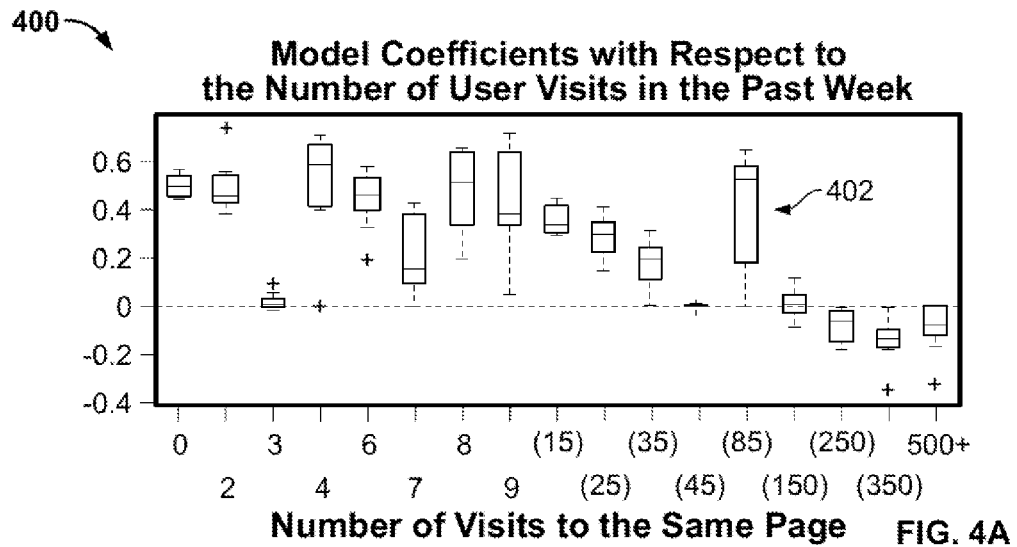
FIGS. 4A-B show example graphs of model coefficients that take number of page requests into account.
Figure 4B:
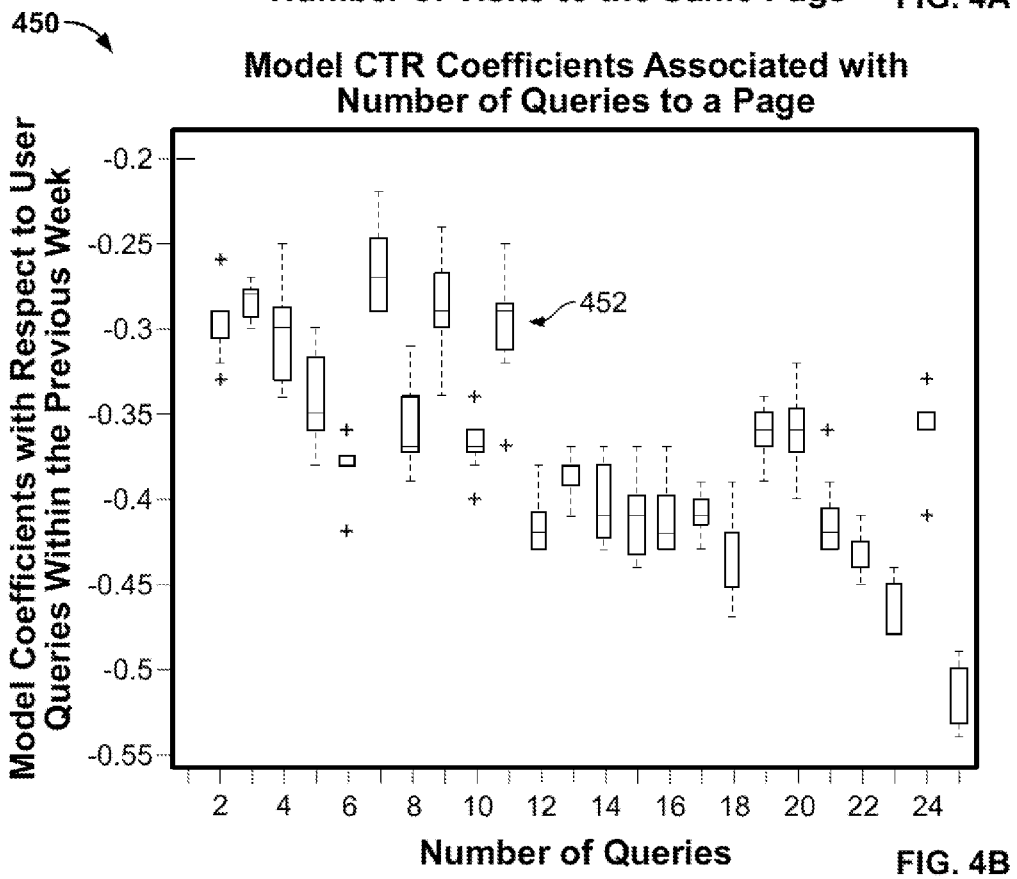

FIGS. 4A-B show example graphs 400 and 450 of model coefficients that take number of page requests into account. That is, the collections of online activity data for the graphs 400 and 450, respectively, here reflect how many times a user has visited the same page during a particular time interval (e.g., the past seven days). The determined model coefficients are indicated by coefficient sets 402 and 452 analogous to the ones above. The graph 400 indicates that the number of past visits can be used as an indicator of interaction proneness.

In the graph 450 the number measured against the horizontal axis is the number of queries; e.g., the number of times that the user utilized a particular search engine and obtained a results page that included advertisements. Here, by contrast, the coefficient sets 452 all have negative values, meaning that the number of past visits is not a good indicator of interaction proneness.

Figure 5A:
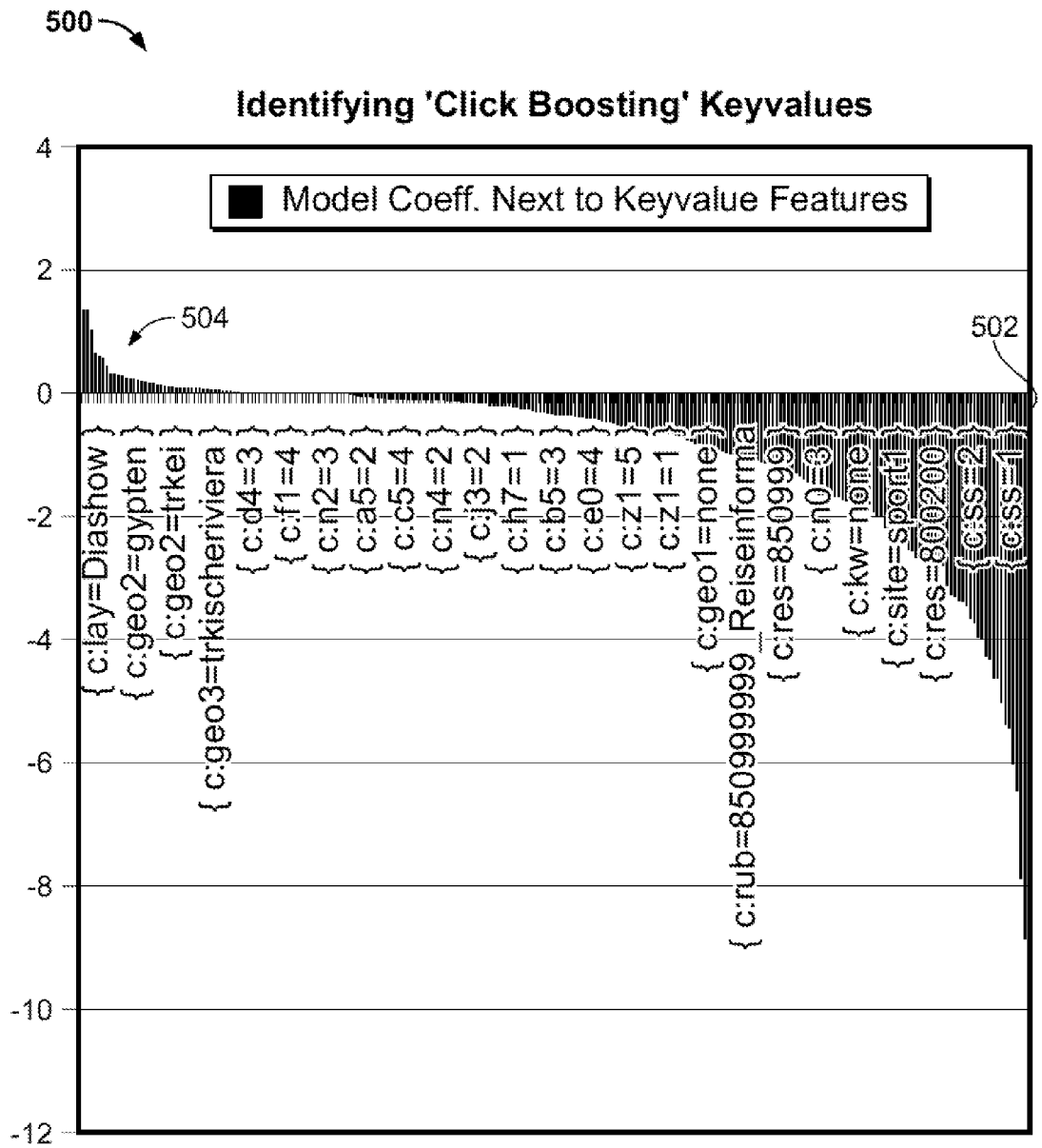
FIGS. 5A-B show example graphs of model coefficients that take keyvalues and/or keywords into account.
Figure 5B:
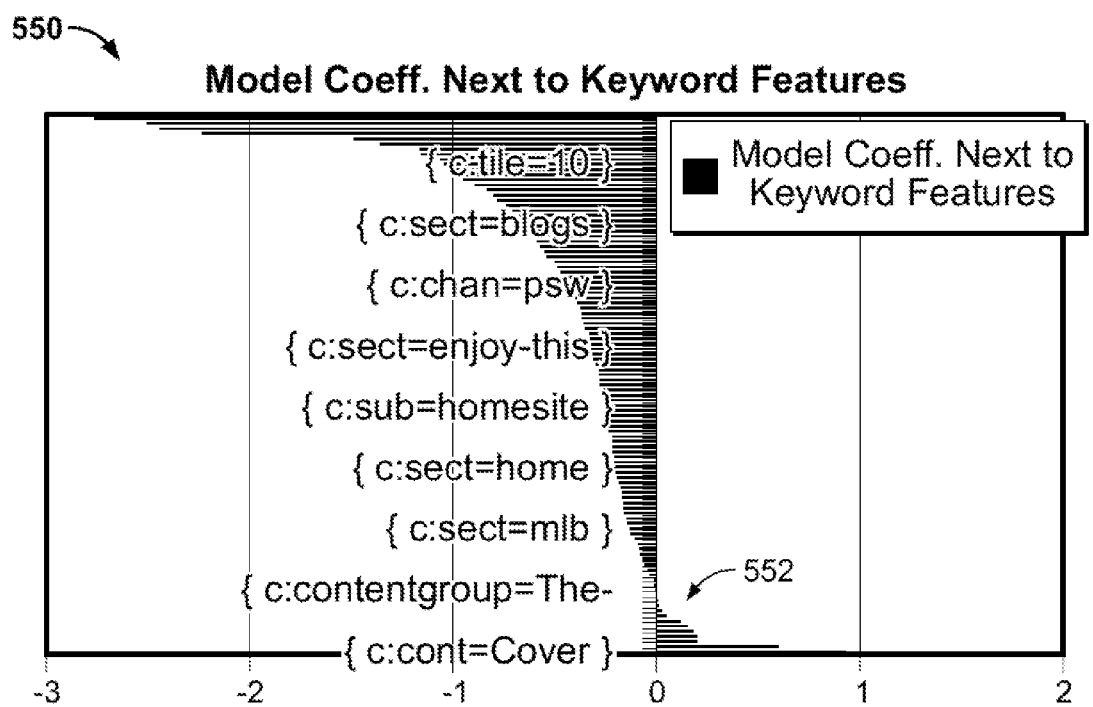

FIGS. 5A-B show example graphs 500 and 550 of model coefficients that take keyvalues and/or keywords into account. That is, the online activity data for the graph 500 here reflects keyvalues from the click records, such as various characteristics associated with the user, the user's device, the page where the ad was placed, or other circumstances regarding the user's click. Based on this, the sensitivity coefficients are determined for the respective keyvalues and are plotted as staples 502. In the graph 500, the coefficient values are positive for a group 504 of keyvalues. Accordingly, these keyvalues can be said to indicate interaction proneness. Similarly, in the graph 550 a group 552 of keyvalues are associated with positive sensitivity coefficients.

Figures 6A, 6B:
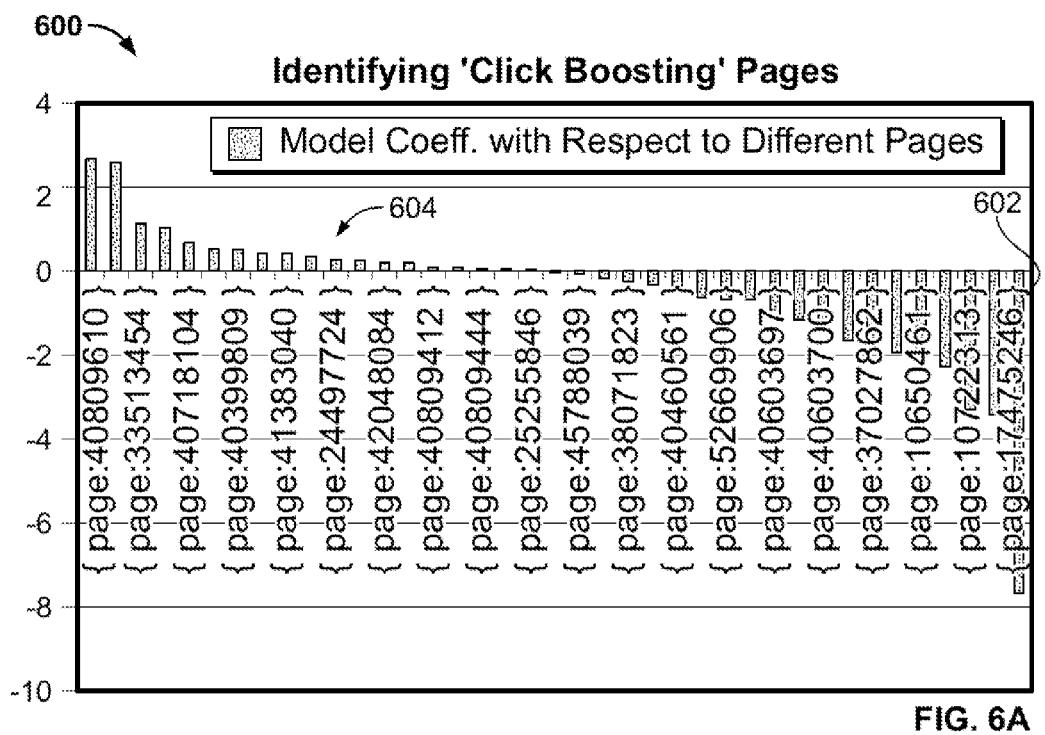
FIGS. 6A-B show example graphs of model coefficients that take page identities into account.

FIGS. 6A-B show example graphs 600 and 650 of model coefficients that take page identities into account. That is, each staple 602 here corresponds to a particular page where the ad was served. The graph 600 shows that a group 604 of pages has positive sensitivity coefficients and therefore indicate interaction proneness. Similarly, in the graph 650 a group 652 of pages has positive sensitivity coefficients.

Figure 7A:
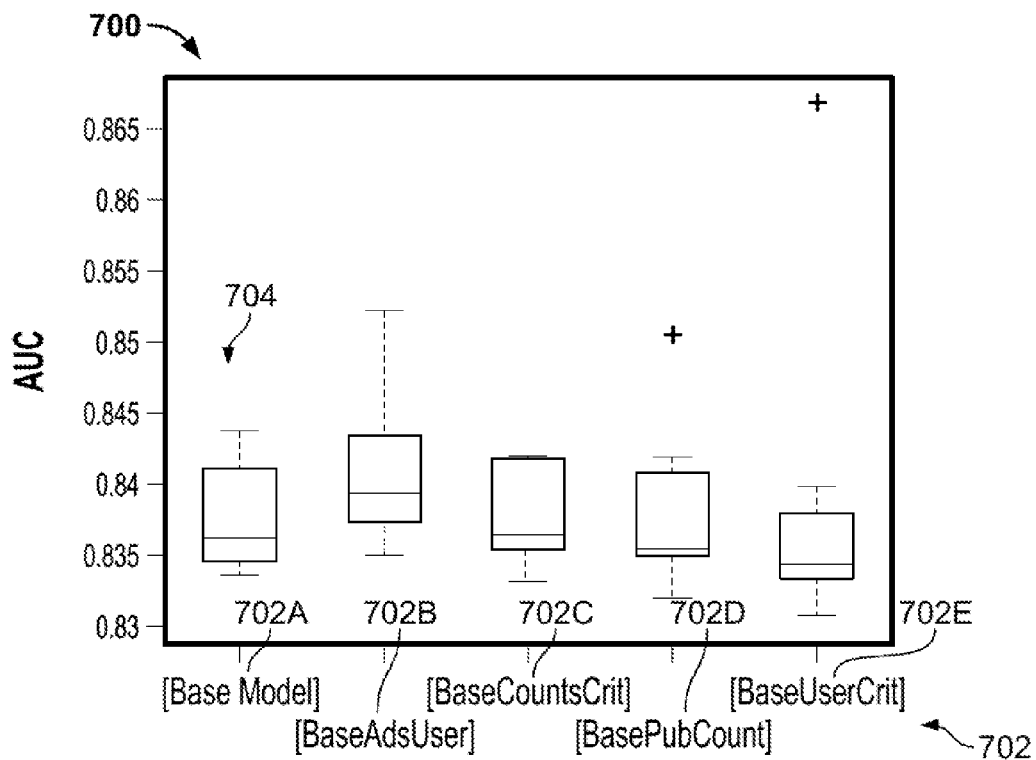
FIGS. 7A-C show examples of identifying one or more characteristics as being associated with interaction proneness.
Figure 7B:
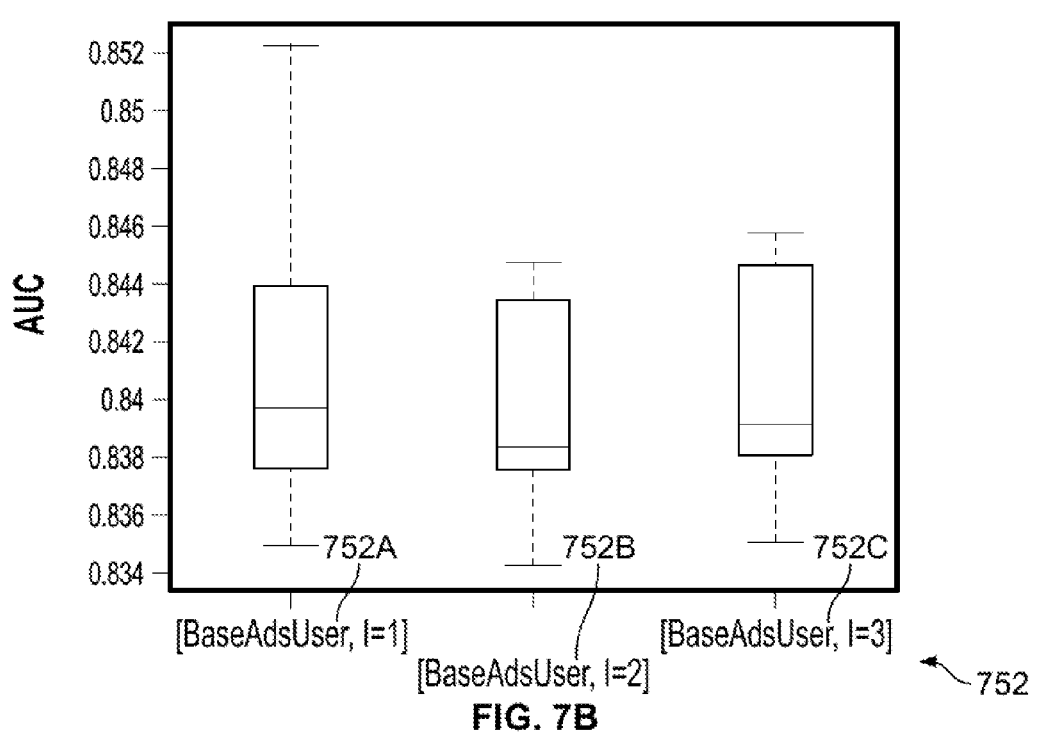
Figure 7C:
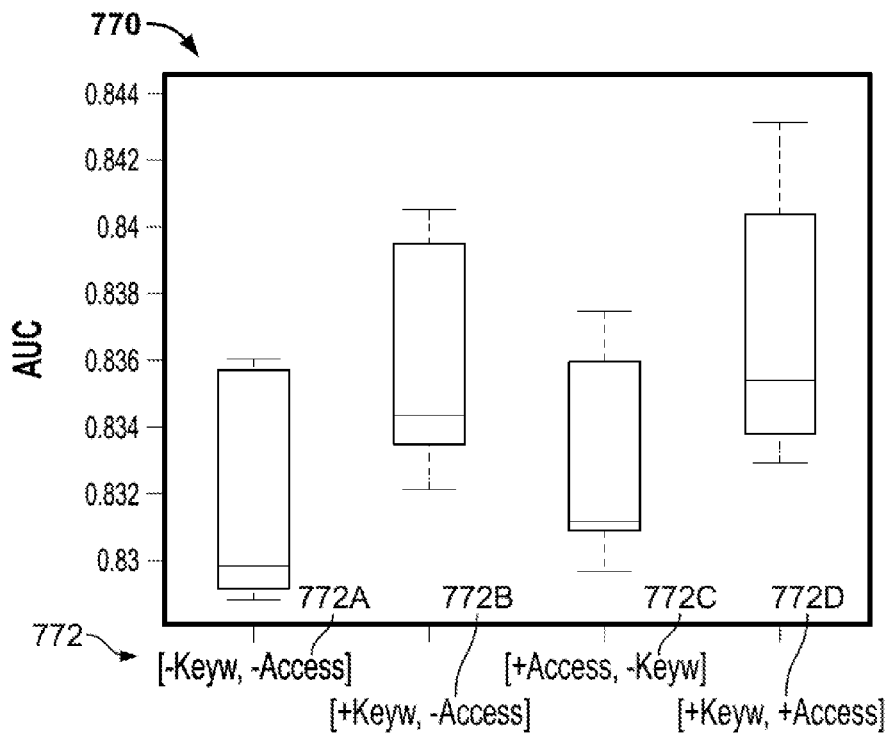

FIGS. 7A-C show examples of identifying one or more characteristics as being associated with interaction proneness. For example, this involves testing five different logistic regression models with regularization. Each of graphs 700, 750 and 770 reflects an area-under-the-curve (AUC) variable as a function of different models.

In the graph 700 models 702A-E are used. That is, multiple instances of a receiver operating characteristic (ROC) curve can be generated using the respective models, with the ROC curves showing the sensitivity values determined using the models 702A-E. The ROC curves can then be analyzed, for example to determine the AUC, to evaluate the models 702A-E. The AUC for the respective models is then plotted in the graph 700.

The model 702A is here called "Base Model" and has the following characteristics. The model 702A considers all input features as linear terms. That is:

$$\log(p/(1-p)) \sim Ax$$

where A is a vector of linear coefficients and x is a set of input features.

The model 702B is called "BaseAdsUser" and incorporates a cross product of two feature sets, in this example called "Ad" and "User" feature sets.

The model 702C is called "BaseCountsCrit" and incorporates a cross product of "Keyword/keyvalue" and "User access behavior" feature sets.

The model 702D is called "BasePubCount" and incorporates a cross product of "Publisher" and "User access behavior" feature sets.

The model 702E is called "BaseUserCrit" and incorporates a cross product of "User" and "Keyword/keyvalue" feature sets.

The graph 700 shows that for this online activity data, incorporating the cross product between "User" and "Ad" properties (i.e., the model 702B) consistently performs well, almost always better than the other models 702.

The graph 750 shows the AUC as a function of models 752A-C, wherein different values of the regularization constant are being tested. For example, the graph 750 can be generated by starting with the best-performing of the models 702A-E (i.e., here the model 702B) and run training with different values of the regularization constant.

The graph 770 illustrates an evaluation whether adding "Keyword/keyvalue" or "User access counts" features sets improve the quality of click-through rate predictions. For example, models 772A-D are here used, in which each of the "Keyword/keyvalue" or "User access counts" features sets are taken into account as follows:

| Model | "Keyword/keyvalue" used | "User access counts" used |
|---|---|---|
| 772A | — | — |
| 772B | Y | — |
| 772C | — | Y |
| 772D | Y | Y |

The graph 770 indicates that consistent gains in the AUC values are obtained compared to the base model that does not use these feature sets.

Figure 9:
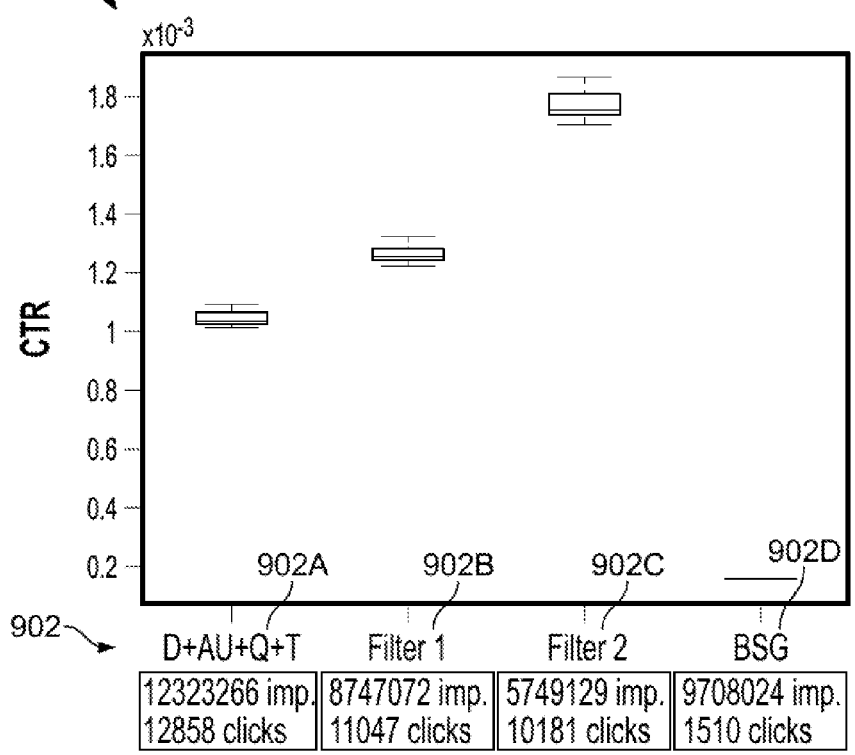
FIGS. 8 and 9 present examples of segments that are created using results/coefficients of training using the best performing model.
Figure 8:
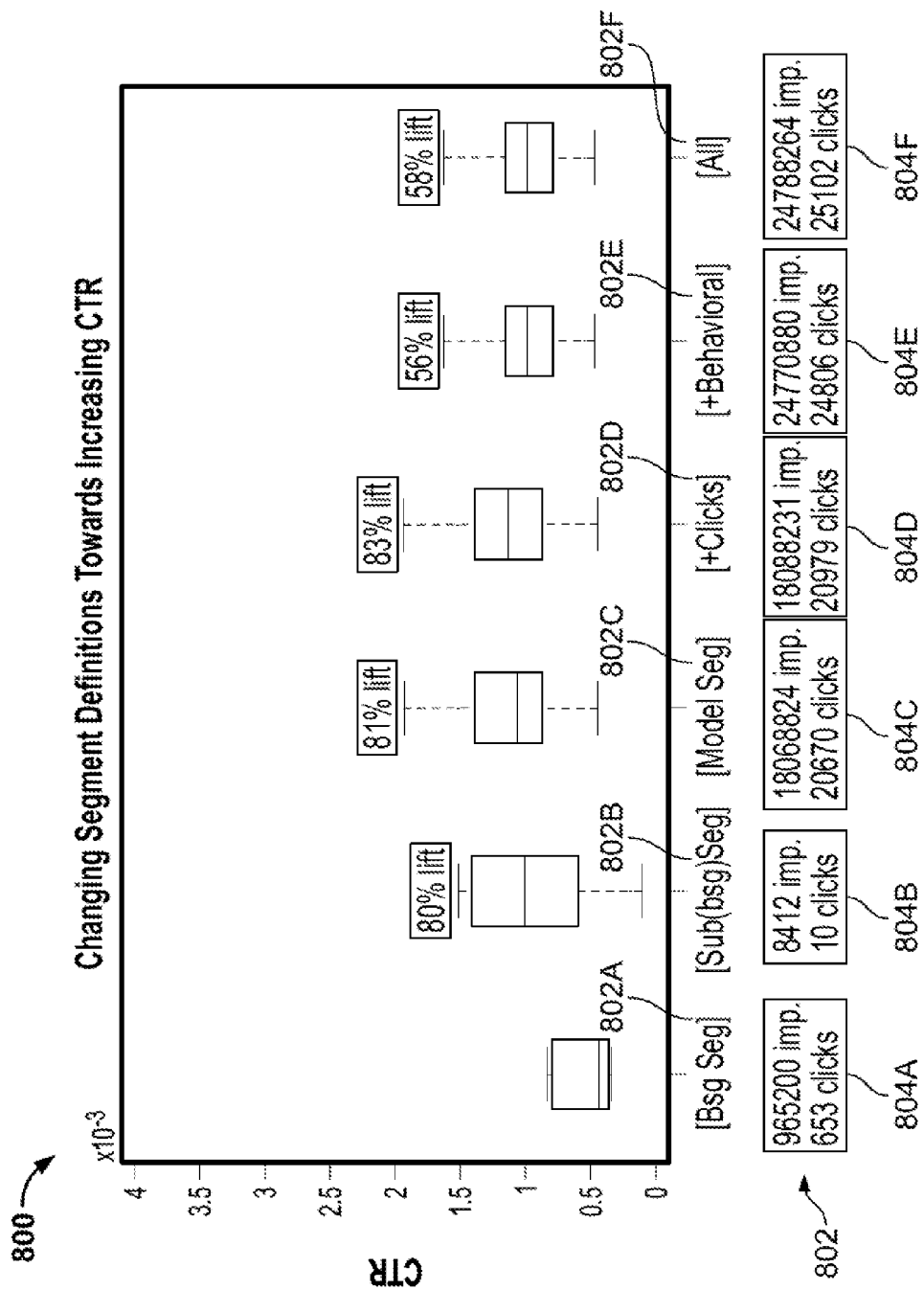

Turning now to FIGS. 8 and 9, they present examples of results from offline experiments run on past data. Particularly, FIGS. 8 and 9 present examples of segments that are created using results/coefficients of training using the best performing model. First, the best performing model is identified using the AUC metric (in the current examples, this was the BaseAdsUser model that incorporated the product of ad and user features). Using the best performing model, the training is performed on some data set (i.e., the data from a month-long time interval). Then, the coefficients are obtained, for example as described above with reference to FIGS. 2-6. Generally in FIGS. 8-9, positive coefficients indicate user proneness to interact with ads with these properties. Thus, if better click-through rate performance from segments is sought, one can define the segments using feature values with positive coefficients.

In FIG. 8, click-through rate is shown for respective segments 802A-F. Particularly, the segment 802A is the current segment definition. Segments 802B-F, in turn, are examples of model-based segment definitions that each include a different set of features in their definitions. Data 804A-F indicates the numbers of clicks and impressions. The data 804A shows the segment 802A obtaining 653 clicks with 965,200 impressions, to name just one example.

In the segment 802B, the model is being used to shrink the segment and increase the click-through rate. The data 804B shows that the numbers of impressions and clicks have been reduced. In other words, this increase of the click-through rate comes at the expense of muss less traffic and clicks.

Each of the segments 802C-F involves a different model-based modification of the segment that increases both the number of impressions and the click-through rate. That is, FIG. 8 illustrates that one can potentially obtain a significant boost in CTR performance (proportion of clicks).

FIG. 9 includes an analogous set of examples for a different data set. Here, a graph 900 shows click-through rate for various segments 902A-D. The model 902D is a base segment, and the models 902A-C are adapted segments that take one or more signals into account.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 is a volatile memory unit in some implementations and is a non-volatile memory unit in other implementations.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for defining a segment based on interaction proneness, the method comprising:
   receiving online activity data that specifies instances of presentation for one or more content items, and instances of user interaction detected for any of the content items;
   training at least one predictive model on the online activity data, the predictive model trained to predict interaction proneness based on a cross product of two characteristics associated with the instances of user interaction;

identifying, using the predictive model, the cross product as being associated with the interaction proneness; and generating at least one segment definition that takes into account the identified cross product.

2. The computer-implemented method of claim 1, wherein the identification involves determining a coefficient for the predictive model that reflects whether and how the instances of user interaction vary with the instances of presentation.

3. The computer-implemented method of claim 1, wherein at least one of the content items is a displayed advertisement, the instances of user interaction include at least one click on the displayed advertisement, and wherein the interaction proneness reflect a user tendency to click on the displayed advertisement.

4. The computer-implemented method of claim 1, wherein the characteristics are selected among signals comprising:
   user location;
   user device information;
   publisher;
   local query time;
   local time of page request;
   page identity;
   content item properties;
   keyword in page request;
   keyvalue
   page visiting history;
   content item interaction history; and
   combinations thereof.

5. The computer-implemented method of claim 1, wherein training the predictive model includes dividing the online activity data into first and second portions and using the first portion to train the predictive model, and wherein identifying the cross product involves applying the trained model to the second portion.

6. The computer-implemented method of claim 5, further comprising ranking at least some of the characteristics with regard to the interaction proneness, wherein the ranking is taken into account in distributing the content item.

7. A computer program product tangibly embodied in a computer-readable storage medium and comprising instructions that when executed by one or more processors perform a method for defining a segment based on interaction proneness, the method comprising:
   receiving online activity data that specifies instances of presentation for one or more content items, and instances of user interaction detected for any of the content items;
   training at least one predictive model on the online activity data, the predictive model trained to predict interaction proneness based on a cross product of two characteristics associated with the instances of user interaction;
   identifying, using the predictive model, the cross product as being associated with the interaction proneness; and
   generating at least one segment definition that takes into account the identified cross product.

8. The computer program product of claim 7, wherein the identification involves determining a coefficient for the predictive model that reflects whether and how the instances of user interaction vary with the instances of presentation.

9. The computer program product of claim 7, wherein at least one of the content items is a displayed advertisement, the instances of user interaction include at least one click on the displayed advertisement, and wherein the interaction proneness reflect a user tendency to click on the displayed advertisement.

10. The computer program product of claim 7, wherein training the predictive model includes dividing the online activity data into first and second portions and using the first portion to train the predictive model, and wherein identifying the cross product involves applying the trained model to the second portion.

11. The computer program product of claim 10, further comprising ranking at least some of the characteristics with regard to the interaction proneness, wherein the ranking is taken into account in distributing the content item.

12. A computer system comprising:
   one or more processors; and
   a computer-readable storage medium having stored therein instructions that when executed by the one or more processors perform a method for defining a segment based on interaction proneness, the method comprising:
      receiving online activity data that specifies instances of presentation for one or more content items, and instances of user interaction detected for any of the content items;
      training at least one predictive model on the online activity data, the predictive model trained to predict interaction proneness based on a cross product of two characteristics associated with the instances of user interaction;
      identifying, using the predictive model, the cross product as being associated with the interaction proneness; and
      generating at least one segment definition that takes into account the identified cross product.

13. The computer system of claim 12, wherein the identification involves determining a coefficient for the predictive model that reflects whether and how the instances of user interaction vary with the instances of presentation.

14. The computer system of claim 12, wherein at least one of the content items is a displayed advertisement, the instances of user interaction include at least one click on the displayed advertisement, and wherein the interaction proneness reflect a user tendency to click on the displayed advertisement.

15. The computer system of claim 12, wherein the characteristics are selected among signals comprising:
   user location;
   user device information;
   publisher;
   local query time;
   local time of page request;
   page identity;
   content item properties;
   keyword in page request;
   keyvalue
   page visiting history;
   content item interaction history; and
   combinations thereof.

16. The computer system of claim 15, wherein training the predictive model includes dividing the online activity data into first and second portions and using the first portion to train the predictive model, and wherein identifying the cross product involves applying the trained model to the second portion.

17. The computer system of claim 15, further comprising ranking at least some of the characteristics with regard to the interaction proneness, wherein the ranking is taken into account in distributing the content item.

* * * * *

UNITED STATES PATENT AND TRADEMARK OFFICE
CERTIFICATE OF CORRECTION

| | |
|---|---|
| PATENT NO. | : 8,756,172 B1 |
| APPLICATION NO. | : 13/209558 |
| DATED | : June 17, 2014 |
| INVENTOR(S) | : Ana Radovanovic et al. |

It is certified that error appears in the above-identified patent and that said Letters Patent is hereby corrected as shown below:

In the Claims:

Column 11, line 27, in Claim 4, delete "keyvalue" and insert -- keyvalue; --, therefor.

Column 12, line 53, in Claim 15, delete "keyvalue" and insert -- keyvalue; --, therefor.

Signed and Sealed this
Second Day of September, 2014

Michelle K. Lee
*Deputy Director of the United States Patent and Trademark Office*